United States Patent [19]

Haake

[11] Patent Number: 5,606,635
[45] Date of Patent: Feb. 25, 1997

[54] FIBER OPTIC CONNECTOR HAVING AT LEAST ONE MICROACTUATOR FOR PRECISELY ALIGNING AN OPTICAL FIBER AND AN ASSOCIATED FABRICATION METHOD

[75] Inventor: John M. Haake, St. Charles, Mo.

[73] Assignee: McDonnell Douglas Corporation, St. Louis, Mo.

[21] Appl. No.: 486,242

[22] Filed: Jun. 7, 1995

[51] Int. Cl.⁶ ........................................ G02B 6/36
[52] U.S. Cl. ............... 385/53; 385/57; 385/58; 385/59; 385/74
[58] Field of Search ................. 385/53, 57, 58, 385/59, 65, 74, 83, 90, 91, 93, 94, 25, 19

[56] References Cited

U.S. PATENT DOCUMENTS

| | | | |
|---|---|---|---|
| 3,836,225 | 9/1974 | Wilde et al. | 385/115 |
| 4,303,302 | 12/1981 | Ramsey et al. | 385/23 |
| 4,357,072 | 11/1982 | Goodfellow et al. | 385/91 |
| 4,523,802 | 6/1985 | Sakaguchi et al. | 385/91 |
| 4,652,081 | 3/1987 | Fatatry | 385/22 |
| 4,679,908 | 7/1987 | Goodwin | 385/91 |
| 4,688,885 | 8/1987 | Poteat et al. | 385/90 |
| 4,701,013 | 10/1987 | Jurczyszyn et al. | 385/15 |
| 4,702,547 | 10/1987 | Enochs | 385/88 |
| 4,720,163 | 1/1988 | Goodwin et al. | 385/90 |
| 4,741,796 | 5/1988 | Althaus | 385/91 X |
| 4,796,975 | 1/1989 | Lukas et al. | 385/50 |
| 4,798,439 | 1/1989 | Preston | 385/91 |
| 4,802,727 | 2/1989 | Stanley | 385/89 |
| 4,844,577 | 7/1989 | Ninnis et al. | 385/9 |
| 4,867,524 | 9/1989 | Courtney et al. | 385/14 |
| 4,934,778 | 6/1990 | Gillett | 385/55 |
| 4,955,683 | 9/1990 | Shiga et al. | 385/88 |
| 5,080,458 | 1/1992 | Hockaday | 385/14 |
| 5,080,461 | 1/1992 | Pimpinella | 385/65 |
| 5,123,073 | 6/1992 | Pimpinella | 385/59 |
| 5,181,214 | 1/1993 | Berger et al. | 372/34 |
| 5,214,727 | 5/1993 | Carr et al. | 385/22 |
| 5,450,508 | 9/1995 | Decusatis et al. | 385/94 X |
| 5,457,765 | 10/1995 | Suzuki et al. | 385/65 X |
| 5,483,608 | 1/1996 | Yokomachi et al. | 385/22 |

FOREIGN PATENT DOCUMENTS

| 2128768 | 8/1983 | United Kingdom . |
|---|---|---|
| 2146841 | 8/1984 | United Kingdom . |

OTHER PUBLICATIONS

*High Gain (21 dB) Packaged Semiconductor Optical Amplifiers*, Electronics Letters, vol. 27, No. 20, Sep. 26, 1991, pp. 1842–1843.

(List continued on next page.)

*Primary Examiner*—Akm E. Ullah
*Assistant Examiner*—Hemang Sanghavi
*Attorney, Agent, or Firm*—Bell, Seltzer, Park & Gibson, P.A.

[57] ABSTRACT

A fiber optic connector and an associated fabrication method includes a connector housing in which a substrate and at least one microactuator mounted on the substrate are disposed. The microactuator is adapted for movement relative to the substrate such that an optical fiber bonded to the microactuator can be controllably positioned with respect to an aperture defined in the front plate of the connector housing. One or more lens elements, such as graded index lens elements, can be at least partially disposed within respective ones of the apertures defined by the connector housing so as to collimate the optical signals transmitted via the respective optical fibers. The microactuator can include at least one bimorphic actuator having first and second layers formed of first and second materials, respectively, which respond differently to electrical stimuli. Accordingly, the bimorphic actuator can be deflected by electrical stimuli so as to be urged against a portion of the substrate to thereby controllably position the carrier relative to the substrate. As a result, the optical fiber can also be controllably positioned relative to a respective lens element. Thus, the optical signals transmitted by the aligned optical fibers can be effectively collimated by the lens elements so that the optical signals are more efficiently coupled to another optical device, such as another optical fiber.

29 Claims, 3 Drawing Sheets

OTHER PUBLICATIONS

*Fiber Attachment For Guided Wave Devices, Journal of Lightwave Technology,* vol. 6, No. 6, Jun. 1988, pp. 862–871.

*High Reliability Packaging For Fibre Optic Sources, SPIE,* vol. 717 Reliability Considerations In Fiber Optic Applications, 1986, pp. 63–73.

H. M. Presby adn C. A. Edwards, *Near 100 Efficient Fibre Microlenses,* Electronic Letters, 12th Mar. 1992, pp. 582–584.

A. Rogner, W. Ehrfeld, D. Münchmeyer, P. Bley, C. Burbaum and J. Mohr, *LIGA–based Flexible Microstructures For Fiber–Chip Coupling,* IMM Institut für Mikrotechnik GmbH, 1991, pp. 167–170.

Lynn Haber, *Opto–electronics Bets On Low Cost, Lightwave,* Feb. 1995.

George Kotelly, *Opto–electronics—High–volume, Low–cost Devices Needed, Lightwave,* Feb. 1995.

R. J. Pimpinella, *A New Type Of Fiber Optic Connector Designed For Military Optical Backplanes, Proceedings Of The 42nd ECTC Conference,* May 18–20, 1992, pp. A61–5.

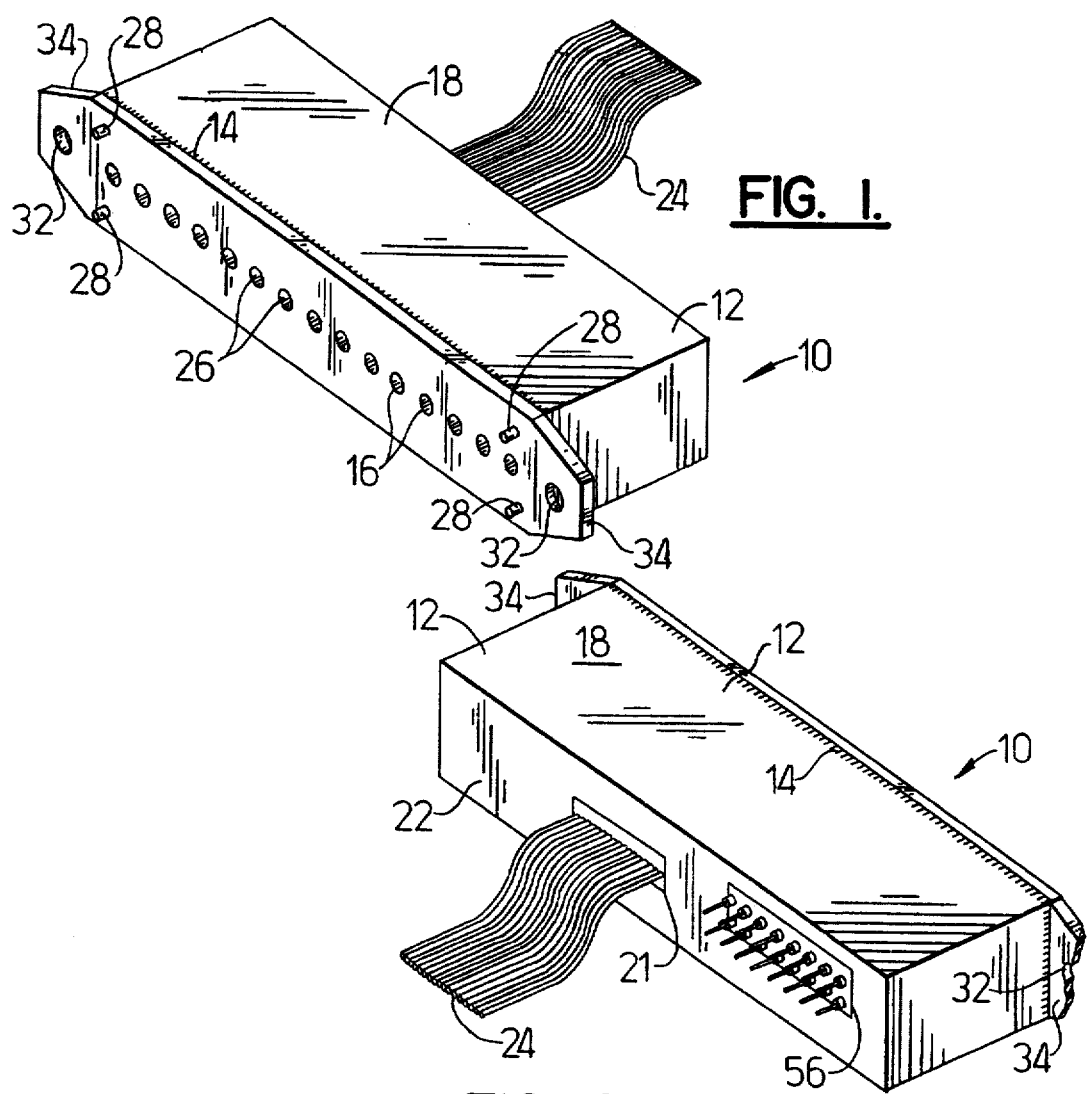
FIG. 1.
FIG. 2.
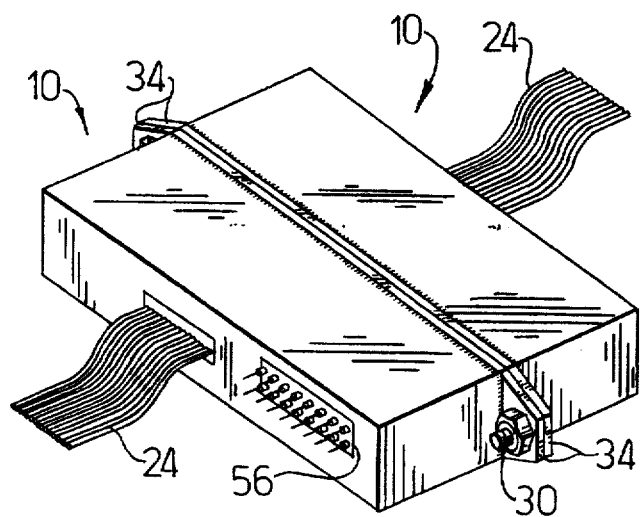
FIG. 3.

FIBER OPTIC CONNECTOR HAVING AT LEAST ONE MICROACTUATOR FOR PRECISELY ALIGNING AN OPTICAL FIBER AND AN ASSOCIATED FABRICATION METHOD

GOVERNMENT RIGHTS

The United States Government has rights in this invention pursuant to a contract awarded by the Department of the Army.

FIELD OF THE INVENTION

The present invention relates generally to fiber optic connectors and associated fabrication methods and, more particularly, to fiber optic connectors having precisely aligned optical fibers and associated fabrication methods.

BACKGROUND OF THE INVENTION

Fiber optic connectors are commonly employed to align and to interconnect one or more optical fibers with a variety of optical devices or with other optical fibers. For example, fiber optic connectors can be mounted on end portions of a pair of fiber optic cables, each of which include a number of optical fibers. The optical fibers of the fiber optic cables can, for example, transmit data or control signals between various remote devices, such as sensors or actuators, and a central control computer, such as a flight controller of an aircraft. The fiber optic connectors can then be interconnected such that the optical fibers of a first fiber optic cable are aligned with the optical fibers of a second fiber optic cable.

In order to efficiently transmit signals between optical fibers, the fiber optic connectors must precisely align the individual optical fibers such that the optical signals transmitted therethrough are efficiently coupled from fiber to fiber. Such alignment is particularly essential in connecting single mode optical fibers which generally have a light transmitting core of approximately 2–10 micrometers in diameter and which must be precisely aligned with the light-transmitting core of another single mode optical fiber of similar size in order to efficiently transmit optical signals therethrough.

In order to effectively couple optical signals from fiber to fiber, a fiber optic connector must maintain the precise alignment of the individual optical fibers in a predetermined manner such that the optical fibers will remain aligned as the fiber optic connecter is mated with another fiber optic connector or with other types of optical device. Therefore, a variety of methods have been developed to align individual optical fibers prior to sealing the optical fibers within the fiber optic connector.

For example, individual metallized optical fibers can be soldered to a support. In order to position the optical fiber, the solder bonding the metallized optical fiber to the support can be heated to a temperature above the predetermined melting temperature of the solder. Thereafter, the optical fiber can be moved and, once the optical fiber is properly positioned, the solder can be allowed to cool and resolidify to fix the position of the optical fiber relative to the support and, to the fiber optic connector. These systems typically require, however, some means, such as solder, for retaining an optical fiber in place after the optical fiber has been positioned in a separate alignment process, distinct from the means for retaining the optical fiber in position.

The alignment process can then be repeated to align the other optical fibers of the fiber optic connector prior to hermetically sealing the fiber optic connector. However, the heat required to allow one optical fiber to be positioned can oftentimes affect the position or alignment of adjacent optical fibers, thereby misaligning the adjacent optical fibers. In addition, these alignment and bonding systems and methods are generally relatively laborious and time-intensive, particularly, in instances in which a number of optical fibers must be individually aligned within the small volume of a single fiber optic connector.

More specifically, a fiber optic connector has been developed by AT&T Bell Laboratories and is described by R. J. Pimpinella in an article entitled "*A New Type of Fiber Optic Connector Designed for Military Optical Backplanes*", published in the Proceedings of the 42nd ECTC Conference on May 18–20, 1992, pages A-6-1 through A-6-5. This fiber optic connector includes a silicon base which defines a v-groove. An optical fiber can be positioned within the v-groove and a ball lens can be disposed adjacent an end portion of the optical fiber to form an optical fiber sub-assembly. The optical fiber sub-assembly can be mated with a second optical fiber sub-assembly, also comprised of an optical fiber and a ball lens mounted to a silicon base, such that the optical signals transmitted by a first optical fiber are collimated by the pair of ball lenses so as to be efficiently coupled to the second optical fiber. In order to prevent unnecessary exposure of the optical fiber to potentially harmful environmental influences, the optical fiber sub-assemblies can be disposed within respective self-sealing connector enclosures. In order to allow the first and second optical sub-assemblies to be mated, however, at least one of the connector assemblies has a spring-loaded cover that retracts upwardly to receive a corresponding portion of the other connector enclosure.

The fiber optic connector disclosed by R. J. Pimpinella as well as the above-described alignment methods and systems do not provide for the precise alignment of one or more optical fibers within a hermetically sealed package, such as a hermetically sealed fiber optic connector. Instead, the retraction of the spring-loaded cover of the connector enclosure of the fiber optic connector disclosed by R. J. Pimpinella can allow contaminants or moisture to enter the connector enclosure. In addition, the fiber optic connector disclosed by R. J. Pimpinella does not provide for realignment of the optical fibers without replacing the silicon bases in which respective v-grooves are defined. Further, the fiber optic connector disclosed by R. J. Pimpinella is also relatively difficult due to the recessed areas adjacent the ball lens.

As known to those skilled in the art, the precise alignment of an optical fiber within a hermetically sealed package is complicated since, in addition to precisely aligning the optical fiber in each of the six degrees of freedom, the alignment process must typically be performed without physically contacting or otherwise heating the optical fiber since heat, such as body heat, can cause the optical fiber to move due to thermal expansion, thereby misaligning the optical fiber. In addition, access to an optical fiber within a hermetically sealed package is generally limited since the optical device with which the optical fiber is being aligned is disposed within an internal cavity defined within the hermetic package.

SUMMARY OF THE INVENTION

It is therefore an object of the present invention to provide an improved fiber optic connector.

It is another object of the present invention to provide an improved fiber optic connector having at least one optical fiber precisely aligned with a corresponding lens element.

It is yet another object of the present invention to provide an improved hermetically sealed fiber optic connector which includes a plurality of optical fibers aligned with respective ones of a plurality of lens elements.

It is a further object of the present invention to provide an improved method of fabricating a fiber optic connector having precisely aligned optical fibers.

These and other objects are provided, according to the present invention, by a fiber optic connector and an associated fabrication method which includes a substrate and at least one microactuator mounted on the substrate and adapted for relative movement therewith such that an optical fiber which is mounted to the microactuator can be precisely aligned. By precisely aligning the optical fibers, such as with respective lens elements, the fiber optic connector of the present invention can efficiently couple the aligned optical fibers, such as single mode optical fibers, with other optical devices, including other optical fibers. In addition, the microactuator can be controllably positioned relative to the substrate so as to precisely align the optical fiber mounted thereto after the connector housing has been hermetically sealed so as to further enhance the precision with which the optical fibers can be aligned.

The microactuator preferably includes a carrier having a carrier body and an optical fiber holding means, such as a groove defined by the carrier body, for receiving an optical fiber and for maintaining the optical fiber in a fixed relation to the carrier body. In one embodiment, the optical fiber is bonded within the groove defined in the carrier body. The microactuator also includes positioning means, such as a bimorphic actuator having first and second layers comprised of first and second materials, respectively. The first and second materials respond differently to electrical stimuli. The bimorphic actuator is therefore deflected by the electrical stimuli so as to be urged against a portion of the substrate. Accordingly, the carrier and the optical fiber bonded thereto can be controllably positioned relative to the substrate.

In one embodiment, the microactuator includes first and second bimorphic actuators and, in a further embodiment, also includes a third bimorphic actuator. The first, second and third bimorphic actuators are disposed so as to deflect in first, second and third orthogonal directions, respectively, in response to the electrical stimuli. Thus, the first, second and third bimorphic actuators are urged against first, second and third portions of the substrate, respectively, to controllably position the carrier in the first, second and third orthogonal directions relative to the substrate.

The first and second materials comprising the first and second layers, respectively, of the bimorphic actuator of one embodiment have first and second coefficients of thermal expansion, respectively. In this embodiment, the fiber optic connector also includes current supply means for providing current to the bimorphic actuator such that first and second materials differentially expand, thereby deflecting the bimorphic actuator. In another embodiment, the second layer of the bimorphic actuator is comprised of a piezoelectric material. In this embodiment, the fiber optic connector also includes voltage supply means for providing voltage to the bimorphic actuator such that the bimorphic actuator deflects. In either embodiment, the bimorphic actuator preferably includes an elongate central portion extending between opposed end portions. The opposed end portions can be affixed to the carrier body such that elongate central portion will controllably bend in response to electrical stimuli.

The fiber optic connector can also include a connector housing defining a plurality of apertures through which the optical signals are transmitted. In this embodiment, the fiber optic connector preferably includes a plurality of optical fibers mounted to respective ones of a plurality of microactuators such that the optical fibers can be precisely aligned with respective apertures defined by the connector housing.

In one advantageous embodiment, the fiber optic connector also includes a plurality of lens elements, such as graded index lens elements, which are at least partially disposed within respective ones of the plurality of apertures defined by the connector housing. Thus, the microactuators can precisely align the plurality of optical fibers with respective ones of the plurality of lens elements such that the optical signals transmitted therethrough can be collimated. In addition, each lens element can include a metallized portion such that the lens elements can be affixed, such as by soldering, within the respective apertures.

Accordingly, the fiber optic connector of the present invention can precisely align one or more optical fibers, such as single mode optical fibers, with respective lens elements such that the optical signals transmitted by the optical fibers can be efficiently coupled to another optical device, such as another optical fiber. In addition, the microactuators of the fiber optic connector can be disposed within the connector housing such that the optical fibers can be aligned with the respective lens elements without physically contacting the optical fiber and, in one advantageous embodiment, after the connector housing has been hermetically sealed such that the alignment of the optical fibers is further enhanced.

BRIEF DESCRIPTION OF THE DRAWINGS

FIG. 1 is a front perspective view of a fiber optic connector according to one embodiment of the present invention.

FIG. 2 is a rear perspective view of a fiber optic connector according to one embodiment of the present invention.

FIG. 3 is a perspective view of a pair of fiber optic connectors according to our embodiment of the present invention which have been mated in an aligned relation.

DETAILED DESCRIPTION OF THE PREFERRED EMBODIMENT

Figure 4:
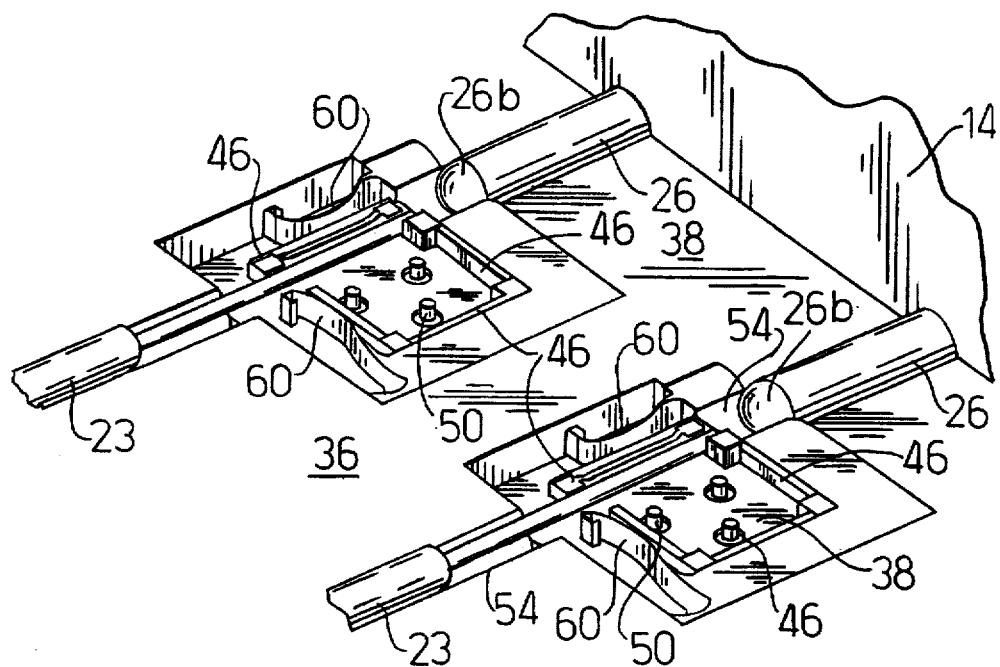
FIG. 4 is a fragmentary perspective view of a portion of the fiber optic connector of one embodiment of the present invention illustrating the substrate and a pair of microactuators mounted therein for aligning a pair of optical fibers with respective lens elements.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to FIG. 1, a fiber optic connector 10 according to one embodiment of the invention is illustrated. The fiber optic connector generally includes a connector housing 12. While the connector housing can be comprised of a variety of materials, the connector housing of one embodiment is comprised of a metal, such as stainless steel, and, in a more specific embodiment, is comprised of KOVAR™ brand stainless steel. As known to those skilled in the art, a KOVAR™ connector housing is comprised of a type of stainless steel which has a coefficient of thermal expansion which matches the coefficient of an optical fiber and thermal expansion of a glass lens element, an optical fiber and the glass of the glass-to-metal seals or bonds, such as between the lens elements and the front plate 14 of the fiber optic connector, as known to those skilled in the art.

As illustrated in FIG. 1, the connector housing 12 can include a face plate 14 defining a plurality of apertures 16 therethrough. The face plate is mounted to the cup-shaped body portion 18 of the connector housing as shown in FIG. 1 to thereby define an internal cavity within the connector housing. According to one embodiment, the face plate can be laser welded or seam sealed to the body portion such that the connector housing is hermetically sealed. In addition, the exterior surface of the front plate can be polished so as to form a relatively planar surface, including the lens elements and the front plate, such that the front plate is more readily cleanable and can be coated, such as with an anti-reflection coating. By polishing the front plate, spurious deflections from surface defects on the front plate can also be minimized. In addition, the front plate can be polished at a predetermined angle, such as 3° to 5°, to prevent light reflections from the respective front plates of a pair of mated fiber optic connectors, thereby minimizing reflected feedback.

As illustrated in FIG. 2, the rear surface of the connector housing 12 can include a slot 21 through which one or more optical fibers 23 extend. For example, a fiber optic cable 24, such as a fiber optic ribbon cable, comprised of a plurality of individual optical fibers can extend through the slot defined in the rear surface of the connector housing. As described in detail below, each of the optical fibers is preferably individually aligned with a respective aperture 16 defined in the front plate 14 of the connector housing.

In order to more efficiently couple the optical signals transmitted by the optical fibers 23, the fiber optic connector 10 of the present invention can include one or more lens elements 26. Preferably, a lens element is disposed within each of the apertures 16 defined in the front plate 14 of the connector housing 12 for collimating the optical signals transmitted by the respective optical fibers. At least a portion of each lens element is preferably metallized, such as with titanium, platinum and gold, such that the lens elements can be affixed, such as by soldering, within the respective apertures defined in the front plate of the connector housing. In one advantageous embodiment, an end portion 26a of each lens element is polished, coated with an anti-reflection coating and aligned with the polished exterior surface of the front plate of the connector housing as illustrated in FIG. 1. The lens elements can also include cylindrical graded index lens elements to further enhance the collimation of the optical signals.

Accordingly, the fiber optic connector 10 of the present invention can precisely align a plurality of optical fibers 23 with respective ones of a plurality of lens elements 26 disposed within the respective apertures 16 defined in the front plate 14 of the connector housing 12. As illustrated in FIG. 3, the fiber optic connector can then be mated with a second fiber optic connector, such that the optical signals transmitted via the optical fibers of the first fiber optic connector can be efficiently coupled to the optical fibers of the second fiber optic connector.

In order to mate the first and second fiber optic connectors 10 such that the respective optical fibers 23 are maintained in an aligned relationship, one of the fiber optic connectors can include a plurality of alignment pins 28 extending outwardly from the front plate 14 as shown in FIG. 1. The front plate of the other fiber optic connector can define a plurality of corresponding apertures adapted to receive respective ones of the alignment pins. Once the fiber optic connectors have been aligned, the fiber optic connectors can be secured in the aligned relationship, such as by extending a connector 30 through corresponding apertures 32 defined in the laterally extending tabs 34 of the respective front plates of the fiber optic connectors as shown in FIG. 3.

As shown in FIG. 4, the fiber optic connector 10 of the present invention preferably includes a substrate 36, such as a metallic, a ceramic or a silicon substrate, and at least one microactuator 38 mounted on the substrate and adapted from relative movement therewith. An optical fiber 23 is preferably affixed to each microactuator such that the relative movement of the microactuator will controllably position the respective optical fiber with respect to an aperture 16 defined in the front plate 14 of the connector housing 12 and, in one advantageous embodiment, with respect to a lens element 26 disposed within the aperture.

As shown in FIG. 4, the fiber optic connector 10 preferably includes a plurality of microactuators 38, one of which is associated with each optical fiber 23a so as to align the respective optical fiber with a corresponding lens element 26. One preferred microactuator is described in detail in a pending U.S. patent application entitled "A Microactuator For Precisely Aligning An Optical Fiber And An Associated Fabrication Method" which is filed concurrently herewith, the contents of which are expressly incorporated by reference herein in their entirety.

Figure 5:
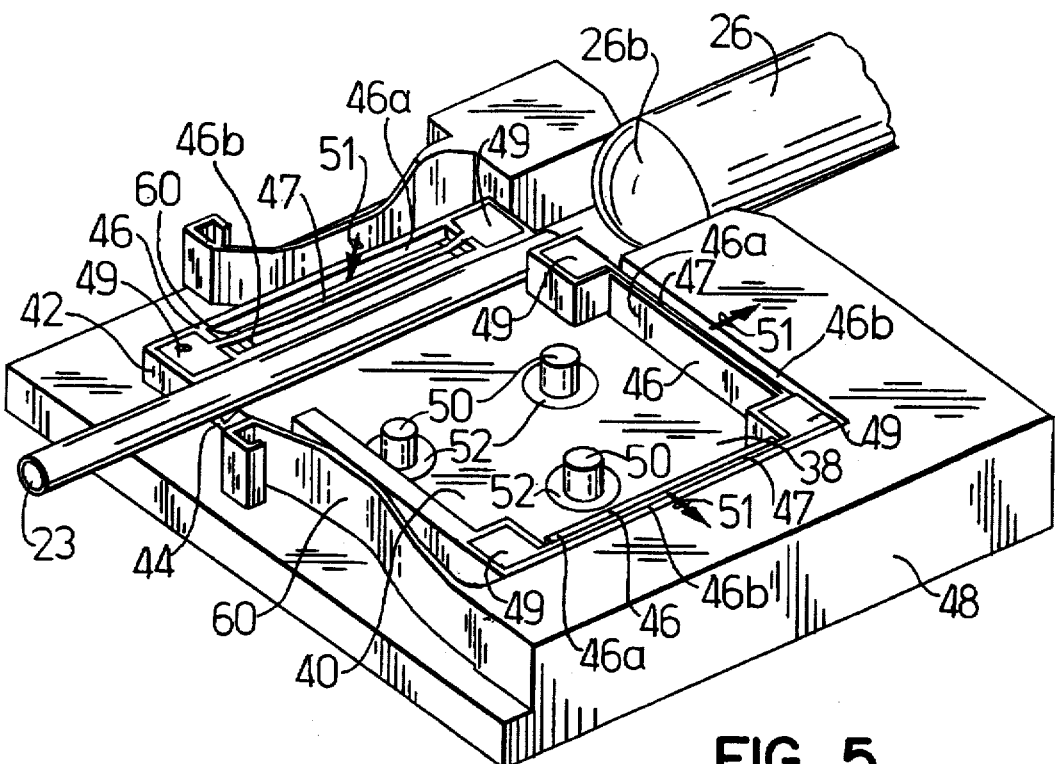
FIG. 5 is a greatly enlarged perspective view of a microactuator of one embodiment of the fiber optic connector of the present invention.

As described therein and as shown in FIGS. 4 and 5, the microactuator 38 includes a carrier 40 having a carrier body 42 and optical fiber holding means for receiving an optical fiber 23 and for maintaining the optical fiber in a fixed relation to the carrier body. Typically, the carrier body is comprised of silicon and can be coated with a material having a relatively low coefficient of friction, such as a TEFLON® coating. However, the carrier body can be comprised of other materials, including metallic materials, without departing from the spirit and scope of the present invention. Furthermore, the optical fiber holding means can include a groove 44, such as a V-shaped groove, defined in the carrier body, such as by an anisotropic wet etch. Accordingly, an optical fiber can be disposed and bonded within the groove defined by the carrier body.

Each microactuator 38 also preferably includes positioning means, such as a bimorphic actuator 46 having first and second layers 46a and 46b comprised of first and second materials, respectively. For example, the bimorphic actuator can be comprised of a BIMORPH® element manufactured by Morgan Matroc, Inc. The first and second materials respond differently to electrical stimuli such that the bimorphic actuator is deflected by the electrical stimuli and is urged against a portion of the substrate 36. In particular, the amount of the deflection is typically proportional to the magnitude of the electrical stimuli applied to the bimorphic actuator. Accordingly, the carrier 40 can be controllably positioned relative to the substrate and the optical fiber 23 mounted to the carrier body 42 can, in turn, be precisely aligned with the lens element 26.

Each bimorphic actuator 46 generally includes an elongate central portion 47 extending between opposed end portions 49a. The opposed end portions can be affixed to the carrier body 42 while the elongate central portion is separated from the carrier body. Alternatively, the opposed end portions can be disposed within slots defined by the carrier body to thereby permit limited relative movement between the opposed end portions and the carrier body. Thus, upon electrical stimulation of the bimorphic actuator, the elongate central portion of the bimorphic actuator will bend in a predetermined direction, such as downwardly or outwardly, as indicated by arrows 51 in FIG. 5. Upon bending in the predetermined direction, the bimorphic actuator is urged against the substrate 36 so as to apply an oppositely directed force to the carrier 40, thereby moving the carrier relative to the substrate. Accordingly, the carrier can be controllably positioned relative to the substrate such that the optical fiber 23 bonded to the carrier is precisely aligned with a respective lens element 26.

According to one embodiment, the first and second layers 46a and 46b of each of the bimorphic actuators 46 are comprised of first and second materials, respectively, which are selected to have first and second coefficients of thermal expansion, respectively. For example, the first material can be silicon while the second material is a metal, such as nickel or copper, having a larger coefficient of thermal expansion than the first material. The metallic second layer can be deposited on the first layer by a variety of methods, including preferential sputtering, directed evaporation and electroplating, without departing from the spirit and scope of the present invention.

In this embodiment, the microactuator 38 also includes current supply means for providing current to the bimorphic actuator 26 to resistively heat the bimorphic actuator such that the first and second materials of the first and second layers, respectively, differentially expand, thereby deflecting the bimorphic actuator. In order to facilitate electrical stimulation of the bimorphic actuators, bonding pads, typically comprised of a conductive material, such as gold, are formed on the opposed end portions 49 of the bimorphic actuators such that an electrical current can be established therebetween.

In other words, since the end portions 49 of the bimorphic actuators 46 are affixed to the carrier body 42 or are retained within respective slots defined by the carrier body and since the metallic layers expand to a greater degree than the respective silicon layers, the elongate central portions 47 of the bimorphic actuators bend downwardly and outwardly as shown in FIG. 5. The elongate central portions of the first and second bimorphic actuators, i.e., the x- and z-bimorphic actuators, are therefore urged against respective sidewalls of the substrate 36 such that the carrier 40 is moved in a direction away from the sidewalls in response thereto. Likewise, the elongate central portion of the third bimorphic actuator, i.e., the y-bimorphic actuator, is urged downwardly against the substrate such that the carrier is moved upwardly in response thereto as shown in FIG. 5. In order to facilitate movement of the third bimorphic actuator, the elongate central portion is preferably separated from the remainder of the carrier body 42 by relief grooves defined laterally alongside the elongate central portion which allow the bimorphic actuator to flex. By therefore controlling the current supplied to the bimorphic actuators, the amount of the bending or deflection and, consequently, the position of the carrier relative to the alignment support structure can be controlled since the amount of bending is generally proportional to the current supplied to the individual bimorphic actuators.

In another embodiment, each bimorphic actuator 46 includes a second layer 46b of an electrostrictive or piezoelectric material which, as known to those skilled in the art, will controllably move or deflect upon the application of a voltage thereto. Thus, the microactuator 38 of this embodiment also includes voltage supply means for providing a voltage to the piezoelectric bimorphic actuator such that the bimorphic actuator controllably deflects. In one exemplary embodiment, the bimorphic actuator includes a first layer 46a comprised of silicon and a second layer comprised of a piezoelectric material, such as PZT or PMN. By controlling the voltage supplied to the bimorphic actuator, the amount of deflection or bending of the piezoelectric bimorphic actuator and, consequently, the position of the carrier 42 relative to the substrate 36 can likewise be controlled. As described above, bonding pads are preferably disposed on the opposed end portions 49 of the bimorphic actuator such that a predetermined voltage can be established therebetween.

As illustrated in FIG. 4, a microactuator 38 can include a plurality of bimorphic actuators 46, such as first, second and third bimorphic actuators in order to controllably position the carrier 40 in three orthogonal directions relative to the substrate 36. As described above, each bimorphic actuator is preferably comprised of first and second layers 46a and 46b comprised of first and second materials, respectively, which respond differently to electrical stimuli. The bimorphic actuators are preferably disposed such that the first, second and third bimorphic actuators deflect in first, second and third orthogonal directions, respectively, in response to electrical stimuli. Accordingly, the first, second and third bimorphic actuators are urged against first, second and third portions of the substrate, respectively, to thereby controllably position the carrier in first, second and third orthogonal positions, respectively, relative to the substrate.

As also illustrated in FIG. 4, the substrate 36 preferably defines recessed portions in which the respective microactuators 38 are disposed. Thus, the bimorphic actuators 46 of the microactuators are preferably urged against the surrounding sidewalls of the substrate upon electrical stimulation of the bimorphic actuator. As illustrated in FIGS. 4 and 5, however, the substrate can also include one or more alignment support structures, one of which is associated with each microactuator. As shown in FIG. 4, the alignment support structures can also be disposed within correspondingly shaped recesses defined by the substrate. In addition, the carriers 40 of the respective microactuators are preferably movably mounted to respective alignment support structures as described in detail in the copending application.

In one embodiment, the substrate 36 can also include bias means for initially positioning the carrier 42. In the illustrated embodiment, the bias means includes a plurality of springs 60 for contacting the carrier, such as a sidewall of the carrier. In particular, the substrate of the illustrated embodiment includes first and second springs associated with each microactuator 38 for initially positioning the carrier in first and second orthogonal directions, respectively.

As illustrated in FIG. 5, the first and second springs 60 preferably urge the microactuator 38 in first and second directions, respectively, which are substantially opposite to the first and second directions in which the first and second bimorphic actuators 46, i.e., the x- and z-bimorphic actuators, urge the microactuator. The bias force provided by the springs and the frictional forces between the carrier 42 and the substrate 36 are preferably less than the force provided by the bimorphic actuators upon deflection, however, such that deflection of the bimorphic actuators overcomes the bias force of the springs and the frictional forces so as to move the predetermined portion of the carrier away from the initial position and into an aligned position relative to the lens element 26.

The microactuator 38 of the present invention can thereby align an optical fiber 23 with a respective lens element 26 by controllably varying the deflection of the respective bimorphic actuators 46. As the respective bimorphic actuators are deflected, the efficiency with which the optical signals produced by the optical device are coupled to and transmitted via the optical fiber can be detected. Once the position in which the optical signals are most efficiently transmitted via the optical fiber is detected, such as by detecting the maximum output power, the optical fiber can be held in position by the bimorphic actuators while the relative positions of the optical fibers and the lens elements are fixed.

In order to fix the relative positions of the optical fibers 23 and the respective lens elements 26, the substrate 36 can include one or more upwardly extending posts 50 associated with each microactuator 38. Correspondingly, the respective carriers 40 can define one or more apertures 52, such as frustoconically shaped apertures, for receiving a respective post. An adhesive, such as a gold/tin eutectic alloy solder, a Gould GlasSolder™ bonding agent or glass frit, can also be disposed within the apertures defined by the carrier such that once the optical fiber is appropriately aligned with a respective lens element, the adhesive can be activated, such as by laser heating or resistive heating, and the carrier can be bonded to the substrate. Accordingly, the alignment of the optical fibers with respective lens elements can be maintained notwithstanding further actuation of the bimorphic actuators 46.

As illustrated in FIG. 4, the substrate 36 can also include one or more sets of first and second grooves 54. The first and second grooves are sized and shaped for receiving an optical fiber 23 and a lens element 26, respectively. As shown, the lens element can include a hemispherically ground surface on a first end 26b and a polished second end 26a to further facilitate the collimation and transmission of optical signals so as to reduce, among other things, spurious reflections. In addition, both end surfaces of the lens element, as well as the end surface of the optical fiber, can be coated with an anti-reflectant coating to further enhance optical transmission.

As shown, each optical fiber 23 received by the fiber optic connector 10 is preferably disposed within a respective groove 54 defined in the substrate 36. A microactuator 38 and a lens element 26 are also associated with each optical fiber such that the microactuator can controllably position the respective optical fiber with the lens element. In addition to being positioned in a predetermined position, such as within an aperture 16 defined by the front plate 14 of the connector housing 12, the lens elements collimate the optical signals.

According to the present invention, a plurality of microactuators 38 can be mounted on a substrate 36 within the internal cavity 20 of the connector housing 12. An optical fiber 23 is also preferably bonded to the carrier body 42 of each microactuator such that the microactuators can controllably position the optical fibers with respect to respective lens elements 26 disposed within apertures 16 defined in the front plate 14 of the connector housing 12. Since the microactuators and the optical fibers mounted thereon need not be physically contacted during the alignment process, the optical fibers can be aligned either prior to or following the hermetic sealing of the connector housing, such as by affixing the front plate thereto.

In embodiments in which the optical fibers 23 are aligned prior to sealing the connector housing 12, the optical fibers can be aligned with respect to respective lens elements. Thereafter, the connector housing can be sealed. For example, a lid can be secured, such as by seam sealing, to the connector housing following alignment of the optical fibers. In addition, the relative positions of the optical fibers can be fixed prior to sealing the connector housing, such as by activating an adhesive between the carrier 40 and the substrate 36 as described below, thereby bonding the carrier to the substrate.

Alternatively, in embodiments in which the optical fibers 23 are aligned after hermetically sealing the connector housing 12 and as illustrated in FIG. 2, the fiber optic connector 10 can also include a plurality of electrical pins 56 which can, in one embodiment, extend through the rear surface 22 of the connector housing to provide electrical access to the bimorphic actuators 46 of the plurality of microactuators 38. In particular, electrical leads preferably interconnect the pins with respective ones of the bimorphic actuators and, more particularly, with bonding pads disposed on the opposed end portions 49 of each bimorphic actuator. Accordingly, by applying appropriate electrical stimuli to predetermined ones of the electrical pins, each optical fiber can be individually positioned in first, second and third orthogonal directions relative to the respective lens element 26 after the connector housing has been hermetically sealed.

By transmitting predetermined optical signals through the optical fibers 23 and by detecting the resulting optical signals transmitted by the respective lens elements 26, the relative alignment of the optical fiber with a respective lens element can be determined. In particular, the position of the optical fiber at which the maximum output power is detected can be determined. In order to obtain the maximum output power, the end surface of the optical fiber is preferably aligned at the focal point of the respective lens element.

Thereafter, the relative positions of the optical fiber 23 and the lens element 26 can be fixed by bonding the carrier 40 to the substrate 36, such as by heating the adhesive disposed within the respective apertures 52 defined by the carrier such that the position of the carrier relative to the substrate which provides the maximum output power remains fixed. For example, the connector housing 12 can include a transparent window through which a laser can be directed so as to heat the adhesive and bond the carrier to the substrate. Alternatively, the hermetically sealed connector housing can include an additional lead which is electrically connected to the substrate or, in one embodiment, to the alignment support structure 48, in the vicinity of the adhesive such that the adhesive can be resistively heated and the carrier can thereby be bonded to the substrate.

Figure 6:
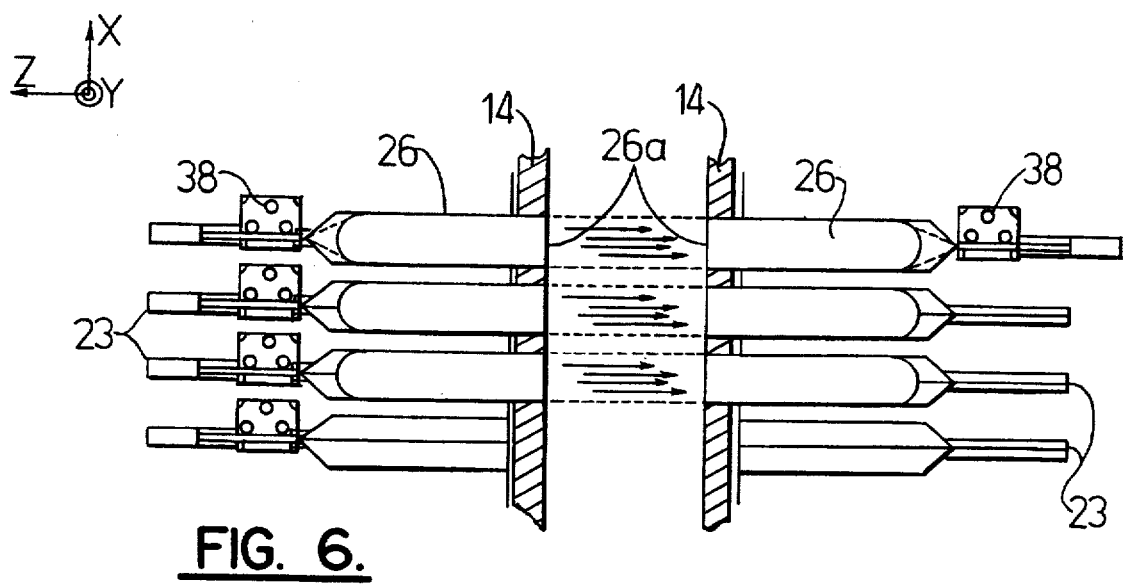
FIG. 6 is a schematic plan view illustrating the transmission of optical signals between the optical fibers of a pair of fiber optic connectors according to one embodiment of the present invention in which only a portion of the respective fiber optic connectors is illustrated for the sake of clarity.

As schematically illustrated in FIG. 6, the lens elements 26 preferably collimate the optical signals such that the signals can be efficiently coupled between a pair of aligned optical fibers 23. Accordingly, optical signals which are transmitted via a plurality of first optical fibers, such as a plurality of single mode optical fibers, and can be efficiently coupled to respective ones of a plurality of second optical fibers due to the precise alignment provided by the fiber optic connector 10 of the present invention. Although not illustrated, the fiber optic connector can align and interconnect the plurality of first optical fibers with a variety of other optical devices, such as a laser diode array or an array of optical waveguides.

In the embodiment of the present invention in which the optical fibers 23 are controllably positioned relative to lens elements 26 following the hermetic sealing of the connector housing 12, the alignment of the optical fibers is further enhanced since the optical fibers are not physically contacted or otherwise heated during the alignment process. In addition, by hermetically sealing the connector housing, the optical fibers are protected from various environmental contaminants, such as moisture and dirt. Further, since the microactuators 38 are mounted to the substrate 36 and remain within the hermetically sealed connector housing, the optical fibers can be repositioned relative to the lens elements to realign or otherwise reposition the optical fibers following use of the fiber optic connector 10 in instances in which the carrier 40 is not bonded to substrate following the initial alignment of the optical fibers.

Accordingly, the fiber optic connector 10 of the present invention can precisely align one or more optical fibers 23, such as single mode optical fibers, with respective lens elements 26 such that the optical signals transmitted by the optical fibers can be efficiently coupled to another optical device, such as another optical fiber. In addition, during the process of aligning and bonding an optical fiber, the microactuator of the present invention does not heat or otherwise perturb adjacent microactuators or the optical fibers maintained therein such that a plurality of adjacent optical fibers can be precisely aligned.

In addition, the microactuators 38 of the fiber optic connector can be disposed within the connector housing 12 such that the optical fibers can be aligned with the respective lens elements without physically contacting the optical fibers and, in one advantageous embodiment, after the connector housing has been hermetically sealed such that the alignment of the optical fibers is further enhanced. Alternatively, the microactuator can permanently bond an optical fiber in an aligned relationship with the optical device.

In the drawings and specification, there has been set forth a preferred embodiment of the invention and, although specific terms are employed, the terms are used in a generic and descriptive sense only and not for purposes of limitation, the scope of the invention being set forth in the following claims.

That which is claimed is:

1. A fiber optic connector comprising:

a substrate;

a lens element disposed in a fixed relation to said substrate; and at least one microactuator mounted on said substrate and adapted for relative movement therewith, said at least one microactuator including a carrier comprising:

a carrier body;

optical fiber holding means for receiving an optical fiber and for maintaining the optical fiber in a fixed position relative to said carrier body; and at least one bimorphic actuator having first and second layers comprised of first and second different materials, respectively, wherein the first and second materials respond differently to electrical stimuli such that the first and second layers change in size in different manners, and wherein said bimorphic actuator is deflected by the electrical stimuli and urged against a portion of said substrate to thereby controllably move said carrier relative to said substrate from an initial position to an aligned position in which the optical fiber which is fixed in position relative to said carrier body is precisely aligned with said lens element.

2. A fiber optic connector according to claim 1 wherein said at least one bimorphic actuator comprises first and second bimorphic actuators, each bimorphic actuator having first and second layers comprised of first and second materials, respectively, which respond differently to electrical stimuli, wherein said first and second bimorphic actuators are disposed such that said first and second bimorphic actuators deflect in first and second orthogonal directions, respectively, in response to the electrical stimuli and urged against first and second portions of said substrate, respectively, to thereby controllably position said carrier in the first and second orthogonal directions relative to said substrate.

3. A fiber optic connector according to claim 2 wherein said at least one bimorphic actuator further comprises a third bimorphic actuator having first and second layers comprised of first and second materials, respectively, which respond differently to electrical stimuli, wherein said third bimorphic actuator is disposed so as to deflect in a third direction, orthogonal to the first and second directions, and be urged against a third portion of said substrate in response to electrical stimuli to thereby controllably position said respective carrier in the third direction relative to said substrate.

4. A fiber optic connector according to claim 1 wherein the first and second materials comprising the first and second layers, respectively, of said bimorphic actuator have first and second coefficients of thermal expansion, respectively, and wherein the fiber optic connector further comprises current supply means for providing current to said bimorphic actuator such that the first and second materials differentially expand to thereby deflect said bimorphic actuator.

5. A fiber optic connector according to claim 1 wherein the second layer of said bimorphic actuator is comprised of a piezoelectric material, and wherein the fiber optic connector comprises voltage supply means for providing a voltage to said bimorphic actuator such that said bimorphic actuator deflects.

6. A fiber optic connector according to claim 1 wherein said bimorphic actuator comprises an elongate central portion extending between opposed end portions, and wherein the opposed end portions are affixed to said carrier body such that the elongate central portion bends in response to the electrical stimuli.

7. A fiber optic connector according to claim 1 wherein said lens element is a graded index lens element.

8. A fiber optic connector according to claim 1 further comprising a connector housing in which said microactuator is disposed, wherein said connector housing defines at least one aperture in which said lens element is at least partially disposed.

9. A fiber optic connector according to claim 8 wherein said lens element comprises a metallized portion adapted to be disposed within a respective aperture defined by said connector housing such that said lens element can be affixed therein.

10. A fiber optic connector according to claim 8 wherein said connector housing further defines a plurality of apertures, and wherein the fiber optic connector further comprises:

a plurality of lens elements disposed within respective ones of said plurality of apertures; and a plurality of microactuators for precisely aligning the optical fibers with respective ones of said lens elements.

11. A fiber optic connector according to claim 1 wherein said optical fiber holding means comprises a groove defined in said carrier body.

12. A fiber optic connector comprising:

a hermetically sealed connector housing defining a plurality of apertures through which optical signals are transmitted;

a substrate disposed within said connector housing; and a plurality of microactuators mounted on said substrate and adapted for relative movement therewith, each microactuator including a carrier comprising:

a carrier body;

optical fiber holding means for receiving a respective optical fiber and for maintaining the optical fiber in a fixed position relative to said carrier body; and positioning means, responsive to actuation external to said hermetically sealed connector housing, for controllably positioning the carrier in at least two orthogonal directions relative to the substrate after the carrier and the substrate have been hermetically sealed within said connector housing such that the carrier is moved from an initial position to an aligned position in which the optical fiber which is fixed in position relative to said carrier body is precisely aligned with a respective aperture defined by said connector housing.

13. A fiber optic connector according to claim 12 wherein said positioning means comprises first and second bimorphic actuators, each bimorphic actuator having first and second layers comprised of first and second materials, respectively, which respond differently to electrical stimuli, wherein said first and second bimorphic actuators are disposed such that said first and second bimorphic actuators deflect in first and second orthogonal directions, respectively, in response to the electrical stimuli and urged against first and second portions of said substrate, respectively, to thereby controllably position said respective carrier in the first and second orthogonal directions relative to said substrate.

14. A fiber optic connector according to claim 13 wherein said positioning means further comprises a third bimorphic actuator having first and second layers comprised of first and second materials, respectively, which respond differently to electrical stimuli, wherein said third bimorphic actuator is disposed so as to deflect in a third direction, orthogonal to the first and second directions, and be urged against a third portion of said substrate in response to electrical stimuli to thereby controllably position said respective carrier in the third direction relative to said substrate.

15. A fiber optic connector according to claim 13 wherein the first and second materials comprising the first and second layers, respectively, of said bimorphic actuator have first and second coefficients of thermal expansion, and wherein the fiber optic connector further comprises current supply means for selectively providing current to each of said bimorphic actuator such that the first and second materials differentially expand to thereby deflect said respective bimorphic actuators.

16. A fiber optic connector according to claim 12 wherein the second layer of at least one of said bimorphic actuators is comprised of a piezoelectric material, and wherein the fiber optic connector comprises voltage supply means for providing a voltage to said at least one bimorphic actuator such that said at least one bimorphic actuator deflects.

17. A fiber optic connector according to claim 12 wherein each bimorphic actuator comprises an elongate central portion extending between opposed end portions, and wherein the opposed end portions are affixed to said carrier body such that the elongate central portion bends in response to the electrical stimuli.

18. A fiber optic connector according to claim 12 further comprising a plurality of lens elements disposed at least partially within respective ones of the plurality of apertures defined by said connector housing such that said plurality of microactuators precisely align the optical fibers with respective ones of said plurality of lens elements.

19. A fiber optic connector according to claim 18 wherein said plurality of lens elements comprise a plurality of graded index lens elements.

20. A fiber optic connector according to claim 18 wherein each lens element comprises a metallized portion adapted to be disposed within a respective aperture defined by said connector housing such that the respective lens element can be affixed therein.

21. A fiber optic connector according to claim 12 wherein said optical fiber holding means comprises a groove defined in said carrier body.

22. A method of fabricating a fiber optic connector comprising the steps of:

mounting a carrier to a substrate such that the carrier is adapted to move relative to the substrate, wherein the carrier includes at least one bimorphic actuator having first and second layers comprised of first and second different materials, respectively, which respond differently to electrical stimuli such that the first and second layers change in size in different manners;

disposing an optical fiber in a fixed position relative to the carrier;

disposing a lens element in a fixed position relative to the substrate; and deflecting the bimorphic actuator of the carrier such that the bimorphic actuator is urged against a portion of the substrate to thereby controllably move the carrier relative to the substrate from an initial position to an aligned position in which the optical fiber which is fixed in position relative to the carrier is precisely aligned with the lens element.

23. A method according to claim 22 wherein said deflecting step comprises the step of electrically stimulating the bimorphic actuator.

24. A method according to claim 22 wherein said mounting step comprises the step of mounting a plurality of carriers to the substrate, wherein said step of disposing an optical fiber in a fixed position relative to the carrier comprises the step of mounting an optical fiber on each carrier, wherein said step of disposing a lens element in a fixed position relative to the substrate comprises the step of disposing a plurality of lens elements in respective fixed positions relative to the substrate, and wherein said deflecting step comprises the step of individually deflecting the bimorphic actuator of each carrier such that each carrier is controllably positioned relative to the substrate and the optical fiber mounted on each carrier is precisely aligned with a respective lens element.

25. A method according to claim 22 further comprising the steps of:

disposing the substrate and the carrier within a connector housing; and hermetically sealing the connector housing with the substrate and the carrier disposed therein prior to said deflecting step.

26. A method according to claim 25 wherein the connector housing defines at least one aperture therein, and wherein said step of disposing the lens element in a fixed position relative to the substrate comprises the step of at least partially disposing the lens element in the aperture defined by the connector housing.

27. A method according to claim 26 wherein the lens element is at least partially metallized, and wherein said step of at least partially disposing the lens element the aperture defined by the connector housing comprises the step of soldering the metallized portion of the lens element to the connector housing.

28. A method according to claim 22 further comprising the step of bonding the carrier to the substrate following said deflecting step.

29. A method according to claim 22 wherein said step of disposing the optical fiber in a fixed position relative to the carrier comprises the step of bonding the optical fiber to the carrier.

* * * * *